Patented Nov. 17, 1925.

1,562,262

UNITED STATES PATENT OFFICE.

OMAR H. SMITH, OF NEW YORK, N. Y., ASSIGNOR TO THE NAUGATUCK CHEMICAL COMPANY, A CORPORATION OF CONNECTICUT.

PROCESS OF TREATING RUBBER AND THE PRODUCTS THEREOF.

No Drawing. Application filed September 15, 1924. Serial No. 737,695.

*To all whom it may concern:*

Be it known that I, OMAR H. SMITH, a citizen of the United States, residing in New York, county of Bronx, State of New York, have invented certain new and useful Improvements in Processes of Treating Rubber and the Products Thereof, of which the following is a full, clear, and exact description.

This invention relates to a process of treating rubber and to the products thereof, more particularly to a process for preserving latex and for accelerating vulcanization, either by incorporation of the accelerator in the rubber as latex or by milling it in.

Inorganic accelerators of vulcanization have been known for many years, and more recently a large number of organic accelerators have been developed. Many of these accelerators are expensive, some of them are not stable, others are objectionable by reason of toxic effects, many of them become active at such a low temperature that they cannot be used for mixing on a mill without causing "scorching" or "burning" of the rubber, and some of them color the vulcanized product, lead compounds for instance being capable of use only with black rubber compounds. In certain cases it is desirable to add an accelerating agent directly to the rubber in the form of latex, and with many of the accelerators at present in use this procedure is not possible owing to the fact that the accelerators are solids, which are not water-soluble or easily kept in suspension in the liquid, or in the case of some of the organic compounds they are oily liquids which are not miscible with water, and many of the known accelerators also exert a strong coagulative effect which prohibits their use with latex. Rubber latex easily coagulates after being withdrawn from the tree, and in cases where it is to be kept for any length of time it is necessary to add a preservative of some kind. Many different substances have been proposed as preservatives but the only ones which have been used to any extent are formaldehyde and ammonia, and even these are open to certain objections such as odor, volatility, cost, etc. As far as I am aware there is no substance in use as a preservative of latex which at the same time is capable of functioning as an accelerator of vulcanization.

An object of my invention is to provide a process for accelerating vulcanization by the incorporation in rubber on a mill of a cheap, stable, effective and non-burning accelerator. Another object is to provide a water-soluble accelerator which is directly miscible with latex without coagulation of the latter. Another object is to provide a cheap, stable, water-soluble preservative for latex which will not coagulate the latter when used in any reasonable quantity and which is also capable of functioning as an accelerator of vulcanization. The invention also includes the products of the process.

The invention consists broadly in incorporating with rubber, either as latex or in its plastic form, one or more of certain phosphates which act as accelerators and in the case of latex also act as preservatives, converting the mix into the desired rubber-containing material or article, and curing.

For a detailed disclosure of the nature and objects of the invention, reference is had to the accompanying specification and claims.

I have found that certain salts of phosphorous acids have the property of accelerating vulcanization when added to rubber either in the form of latex or when milled into rubber in its plastic form, and I have also found that certain phosphates when added to latex act both as preservatives of the latter and as accelerators.

As one example of the invention as applied to the acceleration of vulcanization, the following is given:

Rubber latex containing 33% solids was mixed with 2% of hydrated trisodium phosphate and the resulting mixture then converted into crude rubber by the spray drying process. 100 parts of this rubber was then compounded with 10 parts of sulphur and cured in a mold for 45 minutes at 40 lbs. steam. The resulting vulcanized rubber when tested gave a tensile of 3200 lbs.

As another example of the method a similar latex was mixed with 3½% of hydrated trisodium phosphate and spray dried. The resulting rubber was then compounded with 10 parts of sulphur and cured in a mold for 20 minutes at 40 lbs. steam. A sample of this vulcanized rubber gave a tensile of 3500 lbs.

As still another example of the invention, 100 parts of rubber and 10 parts of sulphur were incorporated with 3 parts of hydrated tripotassium phosphate by milling, and the compound cured in a mold for 60 minutes at 40 lbs. steam. A sample of this rubber gave a tensile strength of 3140 lbs. A blank from a mix composed of 100 parts rubber and 10 parts sulphur without accelerator, when cured under the same conditions was too weak to obtain any tensile data. Tests were also made using instead of tripotassium phosphate or trisodium phosphate, potassium pyro phosphate, secondary sodium phosphite, sodium ammonium hydrogen phosphate, secondary ammonium phosphate, sodium pyro phosphate, and secondary sodium phosphate, the effectiveness of these substances as accelerators, either with latex or when milled in, decreasing in the order named.

As an example of the application of the invention for preserving latex, the following is given:

Ordinary latex preserved by ammonia was treated by means of a current of air until its ammonia content was reduced to .05%, and to this latex 3 parts of hydrated commercial trisodium phosphate were added. Latex freed from ammonia as described almost invariably coagulated over night, while similarly treated latex to which the trisodium phosphate was added remained in good condition at the end of three months. Among other phosphates tested in the preservation of latex were tripotassium phosphate, potassium pyro phosphate, sodium pyro phosphate, disodium phosphate, and sodium hydrogen ammonium phosphate, these substances decreasing in their effectiveness as preservatives in the order named.

It has been found that the efficiency of the salts of phosphorous acids either as preservatives or as accelerators can be accurately predicted from the results of measurement of their hydrogen ion concentrations in 2% aqueous solution. Any phosphate which has a hydrogen ion concentration less than $1 \times 10^{-6}$ will accelerate vulcanization to some degree. Such compounds are definitely alkaline to methyl red, but are not always alkaline to phenol phthalein. In order to act as a preservative of latex, however, a phosphate must have a hydrogen ion concentration less than $1 \times 10^{-8}$, and such compounds are always alkaline to phenol phthalein.

While tripotassium phosphate gives excellent results as a latex preservative and accelerator of vulcanization, the trisodium phosphate is preferred for both purposes owing to its relative cheapness. In certain cases mixtures of the tertiary phosphates with the other compounds may be used, for instance when it is desired to reduce the hydrogen ion concentration of a preservative mixture without reducing the total amount of base present. While the amount of phosphate necessary to preserve latex for a few weeks does not appreciably affect the latter, it may not be desirable to introduce sufficient phosphate into latex to preserve it for an extended period, say six months, and in such cases the phosphates may be used in conjunction with a reduced amount of ammonia, as the preservative action of the two is cumulative.

It will be seen that by my invention there has been provided a cheap and effective method of preserving latex and of incorporating a vulcanization accelerator with the rubber hydrocarbon, either in the form of latex or by milling into the rubber in its plastic form. When used as preservatives for latex the compounds do not tend to coagulate the latter in reasonable quantity, and being water-soluble are easily mixed therewith. When used as accelerators the compounds disclosed have no tendency to cause scorching or burning when mixed with rubber on the mill and they may be added with equal facility either on the mill or to the rubber in the form of latex. By reason of the double function of the phosphates, the invention is particularly applicable for use with latex. If acceleration only is desired the moisture may be at once withdrawn from the treated latex and the resulting rubber milled and worked up in the usual manner, or instead the latex may be directly used in the manufacture of rubber articles, as by dipping, spreading, and other processes. On the other hand, if the preservative action is also desired, the treated latex may be kept for considerable periods without coagulation and then converted into rubber or directly worked up into articles as before, the phosphates which were added for their preservative action then acting in a double capacity as accelerators.

While specific examples of the invention have been given, it is obvious that it may be varied in its details, and I do not desire it to be limited otherwise than as set forth in the appended claims and their equivalents.

Having thus described my invention, what I claim and desire to protect by Letters Patent is:

1. The process of treating rubber hydrocarbon which consists in incorporating therewith a normal alkaline-base salt of a phosphorous acid.

2. The process of treating rubber hydrocarbon which consists in incorporating therewith a trialkaline-base ortho phosphate.

3. The process of treating rubber hydrocarbon which consists in incorporating therewith a trialkali-metal orthophosphate.

4. The process of treating rubber hydrocarbon which consists in incorporating therewith trisodium orthophosphate.

5. The process of treating rubber hydrocarbon which consists in incorporating with rubber latex a preservative and vulcanization accelerator comprising an alkaline-base salt of a phosphorous acid giving an alkali reaction with phenolphthalein in aqueous solution.

6. The process of treating rubber hydrocarbon which consists in incorporating with rubber latex a preservative and vulcanization accelerator comprising an alkali-metal phosphate giving an alkaline reaction with phenolphthalein in aqueous solution.

7. The process of treating rubber hydrocarbon which consists in incorporating with rubber latex a preservative and vulcanization accelerator comprising a sodium phosphate giving an alkaline reaction with phenolphthalein in aqueous solution.

8. The process of treating rubber hydrocarbon which consists in incorporating with rubber latex a preservative and vulcanization accelerator comprising an alkaline-base phosphate which gives less than $1 \times 10^{-8}$ gram atom of hydrogen ions per liter in 2% aqueous solution.

9. The process of treating rubber hydrocarbon which consists in incorporating with rubber latex a preservative and vulcanization accelerator comprising an ortho phosphate including an alkali metal.

10. The process of treating rubber hydrocarbon which consists in incorporating with rubber latex a preservative and vulcanization accelerator comprising a trialkaline-base ortho phosphate.

11. The process of treating rubber hydrocarbon which consists in incorporating with rubber latex a preservative and vulcanization accelerator comprising trisodium ortho phosphate.

12. The process of making vulcanized rubber which consists in incorporating with rubber hydrocarbon a vulcanization accelerator comprising a normal alkaline-base salt of a phosphorous acid giving an alkaline reaction with phenolphthalein in aqueous solution, producing a rubber compound in desired form therefrom, and curing.

13. The process of making vulcanized rubber which consists in incorporating with rubber hydrocarbon a vulcanization accelerator comprising a trialkali-metal ortho phosphate, and curing.

14. The process of making vulcanized rubber which consists in incorporating with rubber hydrocarbon a vulcanization accelerator comprising trisodium orthophosphate, and curing.

15. The process of making vulcanized rubber which comprises incorporating with rubber latex a preservative and vulcanization accelerator comprising an alkaline-base salt of a phosphorus acid giving an alkaline reaction with phenolphthalein in aqueous solution producing a desired rubber-containing article therefrom, and curing.

16. The process of making vulcanized rubber which consists in incorporating with rubber latex a preservative and vulcanization accelerator comprising a normal alkaline-base phosphate, producing a desired rubber-containing material therefrom, and curing.

17. The process of making vulcanized rubber which consists in incorporating with rubber latex a preservative and vulcanization accelerator comprising an ortho phosphate including an alkali metal, producing a desired rubber-containing material therefrom, and curing.

18. The process of making vulcanized rubber which consists in incorporating with rubber latex a preservative and vulcanization accelerator comprising trisodium ortho phosphate, producing a desired rubber-containing material therefrom, and curing.

19. As a new article, rubber latex containing as a preservative and accelerator of vulcanization an alkaline-base salt of a phosphorous acid giving an alkaline reaction with phenolphthalein in aqueous solution.

20. As a new article, rubber latex containing as a preservative and accelerator of vulcanization an alkaline-base phosphate which gives less than $1 \times 10^{-8}$ gram atom of hydrogen ions per liter in 2% aqueous solution.

21. As a new article, rubber latex containing as a preservative and accelerator of vulcanization an ortho phosphate including an alkali metal.

22. As a new article, rubber latex containing as a preservative and accelerator of vulcanization a normal alkaline-base ortho phosphate.

23. As a new article, rubber latex containing as a preservative and accelerator of vulcanization trisodium ortho phosphate.

24. As a new article, vulcanized rubber having incorporated therein before vulcanization a normal alkaline-base salt of a phosphorous acid giving an alkaline reaction with phenolphthalein in aqueous solution.

25. As a new article, vulcanized rubber having incorporated therein before vulcanization a normal ortho phosphate including an alkali metal.

26. As a new article, vulcanized rubber having incorporated therein before vulcanization trisodium ortho phosphate.

27. As a new article, latex containing a combined preservative and vulcanization accelerator.

Signed at New York, county and State of New York, this 11th day of September, 1924.

OMAR H. SMITH.

Certificate of Correction.

It is hereby certified that in Letters Patent No. 1,562,262, granted November 17, 1925, upon the application of Omar H. Smith, of New York, N. Y., for an improvement in "Processes of Treating Rubber and the Products Thereof," errors appear in the printed specification requiring correction as follows: Page 1, lines 81 and 82; page 2, lines 42 and 122; page 3, lines 7, 48, 93, 114, and 115, for the word "phosphorous" read *phosphorus;* page 2, line 5, for the number "3140" read *3410;* page 3, line 7, claim 5, for the word "alkali" read *alkaline;* and that the said Letters Patent should be read with these corrections therein that the same may conform to the record of the case in the Patent Office.

Signed and sealed this 22d day of June, A. D. 1926.

[SEAL.] M. J. MOORE,
*Acting Commissioner of Patents.*